(12) United States Patent
Kim et al.

(10) Patent No.: US 9,756,209 B2
(45) Date of Patent: Sep. 5, 2017

(54) CLOSE-UP PHOTOGRAPHY METHOD AND TERMINAL SUPPORTING THE SAME

(71) Applicant: Samsung Electronics Co., Ltd., Gyeonggi-do (KR)

(72) Inventors: Mihyang Kim, Gyeonggi-do (KR); Jeonghun Kim, Gyeonggi-do (KR); Kwangweon Park, Gyeonggi-do (KR); Yoywang Im, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/071,101

(22) Filed: Nov. 4, 2013

(65) Prior Publication Data

US 2014/0126028 A1   May 8, 2014

(30) Foreign Application Priority Data

Nov. 2, 2012  (KR) .................. 10-2012-0123658

(51) Int. Cl.
| H04N 1/024 | (2006.01) |
| H04N 1/04 | (2006.01) |
| H04N 1/10 | (2006.01) |
| H04N 5/232 | (2006.01) |
| H04N 5/77 | (2006.01) |

(Continued)

(52) U.S. Cl.
CPC ........... *H04N 1/10* (2013.01); *H04N 5/23245* (2013.01); *H04N 5/23293* (2013.01); *H04N 5/77* (2013.01); *H04N 5/775* (2013.01); *H04N 2101/00* (2013.01)

(58) Field of Classification Search
CPC ...... H04N 7/144; H04N 1/10; H04N 5/23245; H04N 5/23293; H04N 5/77; H04N 5/775; H04N 2101/00; H04W 4/005; G06F 1/1652; G06F 3/04842; G06F 1/1686
See application file for complete search history.

(56) References Cited

U.S. PATENT DOCUMENTS 5,327,503 A * 7/1994 Kiyohara ..................... 382/321
5,748,228 A * 5/1998 Kobayashi et al. ........... 348/63

(Continued)

FOREIGN PATENT DOCUMENTS

| EP | 2 129 103 | 12/2009 |
| JP | 2005-031344 | 2/2005 |

(Continued)

OTHER PUBLICATIONS

European Search Report dated Oct. 29, 2014 issued in counterpart application No. 13191287.5-1902.

(Continued)

*Primary Examiner* — Cheukfan Lee
(74) *Attorney, Agent, or Firm* — The Farrell Law Firm, P.C.

(57) ABSTRACT

A terminal and a close-up photography method using the same are disclosed. The terminal includes a transparent display unit having front and rear surfaces through which light passes, the transparent display unit having a set thickness, at least one camera module disposed on the transparent display unit, configured to acquire an image of a subject in a direction of penetrating the transparent display unit, and a controller configured to control the camera module.

20 Claims, 6 Drawing Sheets

(51) Int. Cl.
*H04N 5/775* (2006.01)
*H04N 101/00* (2006.01)

(56) References Cited

U.S. PATENT DOCUMENTS

| | | | | |
|---|---|---|---|---|
| 6,466,202 | B1* | 10/2002 | Suso | G06F 1/1616 |
| | | | | 345/158 |
| 6,587,231 | B1* | 7/2003 | Sung | 358/497 |
| 7,551,314 | B2* | 6/2009 | Cheung | 358/1.2 |
| 7,695,144 | B2 | 4/2010 | Shin | |
| 8,474,720 | B2* | 7/2013 | Wolf, II | 235/454 |
| 2001/0038412 | A1* | 11/2001 | McNelley | G02B 27/2292 |
| | | | | 348/14.1 |
| 2007/0002130 | A1 | 1/2007 | Hartkop | |
| 2007/0120879 | A1* | 5/2007 | Kanade | H04N 7/144 |
| | | | | 346/107.2 |
| 2008/0106591 | A1 | 5/2008 | Border et al. | |
| 2008/0117311 | A1 | 5/2008 | Panabaker et al. | |
| 2009/0295943 | A1* | 12/2009 | Kim | H04N 5/2251 |
| | | | | 348/231.99 |
| 2009/0295976 | A1* | 12/2009 | Choi | H04N 5/23293 |
| | | | | 348/333.11 |
| 2009/0298537 | A1* | 12/2009 | Choi | H04M 1/72583 |
| | | | | 455/556.1 |
| 2011/0124376 | A1* | 5/2011 | Kim | G06F 1/1626 |
| | | | | 455/566 |
| 2011/0138444 | A1* | 6/2011 | Kang | G06F 21/10 |
| | | | | 726/3 |
| 2011/0292077 | A1 | 12/2011 | Lapstun et al. | |
| 2012/0139835 | A1* | 6/2012 | Morrison | G06F 3/0421 |
| | | | | 345/157 |
| 2012/0194879 | A1 | 8/2012 | Fu et al. | |
| 2012/0249724 | A1* | 10/2012 | Morrison | G06F 3/013 |
| | | | | 348/14.16 |
| 2013/0009863 | A1* | 1/2013 | Noda | G06F 3/005 |
| | | | | 345/156 |
| 2014/0204023 | A1* | 7/2014 | Kumar | G06K 9/00671 |
| | | | | 345/156 |
| 2015/0024728 | A1* | 1/2015 | Jang | H04M 1/72519 |
| | | | | 455/418 |
| 2015/0062175 | A1* | 3/2015 | Kim | G09G 3/3648 |
| | | | | 345/639 |
| 2015/0201148 | A1* | 7/2015 | Kim | H04N 5/44591 |
| | | | | 725/43 |
| 2015/0205451 | A1* | 7/2015 | Lee | G06F 3/0481 |
| | | | | 715/766 |
| 2015/0373480 | A1* | 12/2015 | Park | H04W 4/005 |
| | | | | 715/748 |
| 2016/0012641 | A1* | 1/2016 | Kim | G06T 19/006 |
| | | | | 345/633 |

FOREIGN PATENT DOCUMENTS

| | | |
|---|---|---|
| JP | 2006-064775 | 3/2006 |
| JP | 2006-323383 | 11/2006 |

OTHER PUBLICATIONS

European Search Report dated Nov. 6, 2015 issued in counterpart application No. 13191287.5-1902, 5 pages.

* cited by examiner

CLOSE-UP PHOTOGRAPHY METHOD AND TERMINAL SUPPORTING THE SAME

PRIORITY

This application claims priority under 35 U.S.C. §119(a) to a Korean patent application filed on Nov. 2, 2012 in the Korean Intellectual Property Office and assigned Serial No. 10-2012-0123658, the contents of which are incorporated herein by reference.

BACKGROUND OF THE INVENTION

1. Field of the Invention

The present invention relates generally to image acquisition and, more particularly, to a close-up photography method capable of supporting ultra close-up photography, and a terminal supporting the same.

2. Description of the Related Art

A portable terminal supports specific user functions and is sufficiently compact to be easily transported. The portable terminal integrally supporting various user functions has become mainstream in recent years. Such a portable terminal supports user functions and provides display screens corresponding to user functions. Accordingly, a user utilizes the corresponding functions while viewing the screen output through the display.

The portable terminal includes a camera module that provides camera functions. The user operates the portable terminal including the camera module to acquire, store, and transmit acquired images to an external terminal, thereby photographing scenes that the user wishes to maintain.

In particular, in order to more closely photograph a specific subject, the user minimizes the distance between the subject and the portable terminal. However, when the portable terminal is near the subject, the subject blocks light incident to the camera lens, which compromises the photograph. In addition, when the portable terminal is spaced too far apart from the subject, the terminal fails to properly photograph the subject. As a result, the user has to perform several iterations of attempting to photograph the specific subject up close, in order to adjust a distance between the camera and the subject.

SUMMARY OF THE INVENTION

The present invention has been made in view of the above problems, and provides a close-up photography method capable of easily taking close-up photographs of a subject, and a terminal supporting the same.

In accordance with an aspect of the present invention, a terminal includes a transparent display unit having front and rear surfaces through which light passes, the transparent display unit having a thickness, at least one camera module disposed on the transparent display unit configured to acquire an image of a subject in the direction of penetrating the transparent display unit, and a controller configured to control the camera module.

In accordance with another aspect of the present invention, a close-up photography method includes activating a camera module including at least two cameras which are disposed at locations on a transparent display unit and employ wide view angle lenses, photographing an image of a subject disposed on a rear side of the transparent display unit, and composing images, which the plurality of cameras acquire, to generate a single close-up image for the subject.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE INVENTION

Hereinafter, various embodiments of the present invention will be described in detail with reference to the accompanying drawings. In the accompanying drawings, the same reference numerals are used for the same constituent elements. A detailed description of well-known functions and structures incorporated herein is omitted to avoid obscuring the subject matter of the present invention.

In the accompanying drawings, some configuration elements may be exaggerated, omitted, or schematically shown, and a size of each element may not precisely reflect the actual size. Accordingly, the present invention is not restricted by a relative size or interval shown in the accompanying drawings.

Figure 1:
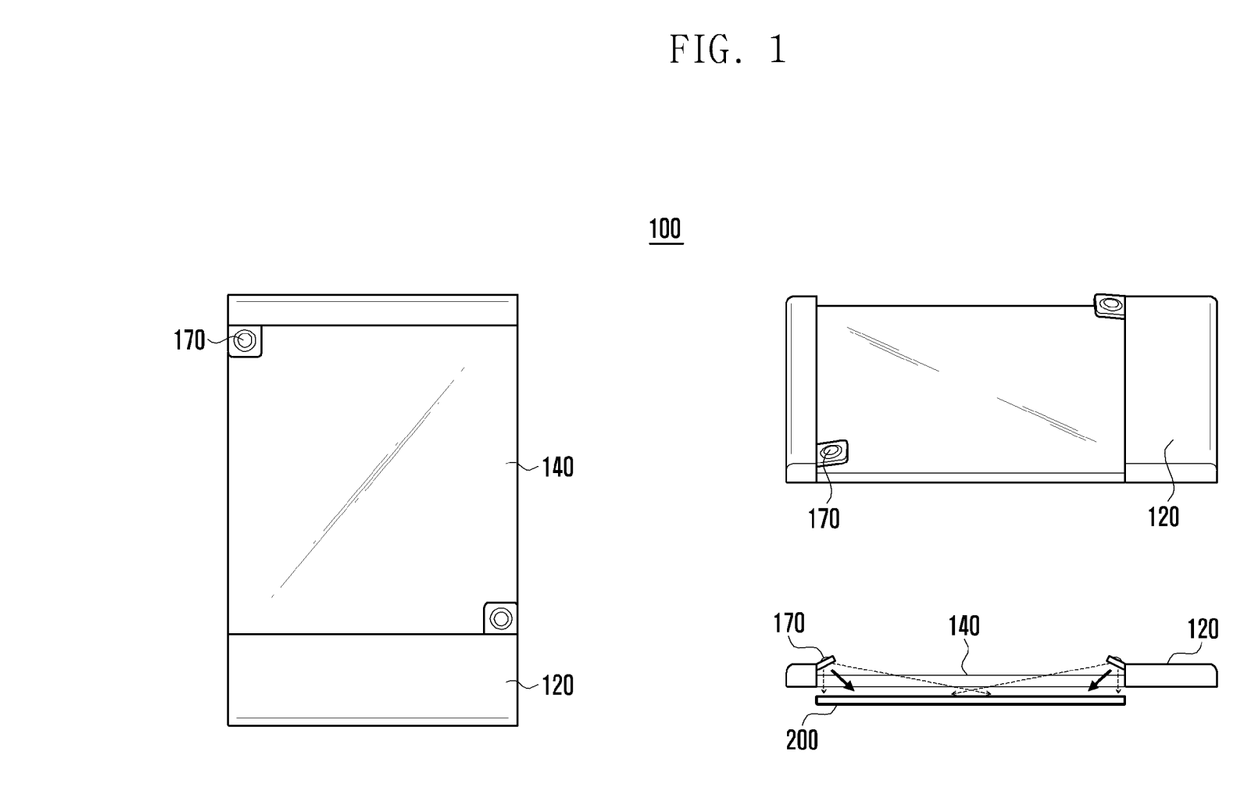
FIG. 1 schematically illustrates an external appearance of a terminal supporting close-up photography according to an embodiment of the present invention.
Figure 2:
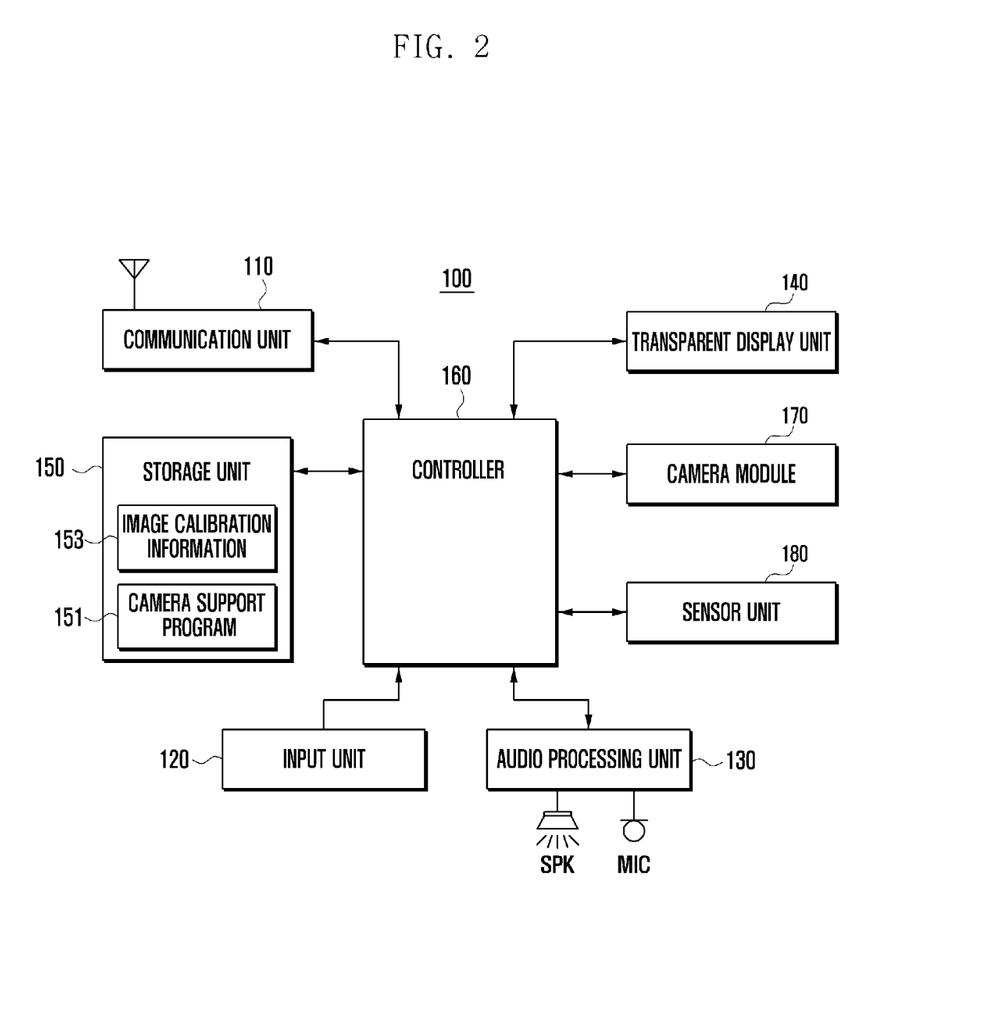
FIG. 2 illustrates a configuration of a terminal shown in FIG. 1.

FIG. 1 schematically illustrates an external appearance of a terminal including a camera module according to an embodiment of the present invention, and FIG. 2 illustrates a configuration of a terminal according to an embodiment of the present invention.

Referring to FIGS. 1 and 2, the terminal 100 includes a communication unit 110, an input unit 120, an audio processing unit 130, a transparent display unit 140, a storage unit 150, a controller 160, a camera module 170 supporting camera functions, and a sensor unit 180. The communication unit 110 is omitted when the terminal 100 supports only the camera functions, and does not support separate communication functions.

The terminal 100 having this configuration supports the camera module 170 to be disposed above the transparent display unit 140 having a set thickness to photograph a subject 200 through the transparent display unit 140, thereby easily taking close-up photographs of the subject 200 adjacent to the transparent display unit 140. In particular, as the camera module 170 is disposed at a location on a side of the transparent display unit 140, and the subject 200 is disposed on an opposite side of the transparent display unit 140, even if the subject 200 contacts the transparent display unit 140 or is located near the transparent display unit 140, light is provided to the camera module 170 through the transparent display unit 140. As a result, the terminal 100 of the present invention allows the camera module 170, which is located above the transparent display unit 140, to easily acquire a close-up image corresponding to the subject 200 disposed on the opposite side of the transparent display unit 140.

While taking the photograph, every time the transparent display unit 140 of the terminal 100 is located above the subject 200, or the subject 200 is located above the transparent display unit 140 of the terminal 100, the terminal 100 of the present invention supports the close-up photography of the subject 200 so that the image is rapidly and readily acquired without adjustment of a focal length for taking a close-up photograph of the subject 200.

As described above, the communication unit 110 is added when the terminal 100 supports the communication functions, but the communication unit 110 is omitted when the terminal 100 does not support the communication functions. The communication unit 110 may form a communication channel with a base station in order to support the communication functions of the terminal 100, receive information from a external device according to a user's control or schedule information, or transmit information stored in the terminal 100 or information acquired through the terminal 100 to the external device. The communication unit 110 is formed of a communication module supporting Near Field Communication (NFC) functions to form NFC channels with other terminals, and transmit the stored image.

In particular, the communication unit 110 transmits the close-up image selected by a user of the close-up images acquired through the camera module 170 to other terminals. Alternately, the communication unit 110 supports video calls with other terminals. During the video calls, when the camera module 170 is selected for activation by the user to take close-up photographs, the communication unit 110 transmits an image acquired through the camera module 170 for the close-up photography to other terminals in real time. Otherwise, when the camera module 170 includes a plurality of camera modules, i.e., for close-up photography, for video calls, and for general photography, the communication unit 110 transmits an image acquired through the camera module for the video calls to other terminals.

The communication unit 110 receives various algorithms for calibration of the close-up image from the external device, and the received algorithms are stored as image calibration information 153 stored in the storage unit 150. The stored image calibration information 153 is used for calibrating the close-up image acquired when a close-up photography mode is activated.

The input unit 120 generates various input signals necessary for operating the terminal 100. The input unit 120 is formed of a keyboard, a keypad, and a key button according to compatibility of the terminal 100. When the transparent display unit 140 is provided as a touch screen, the input unit 120 is formed in a shape of a touch map output on the touch screen. In particular, the input unit 120 generates an input signal for activating the close-up photography mode, selecting automatic image photography during the close-up photography mode, selecting manual image photography during the close-up photography mode, ending the close-up photography mode, operating or ending the close-up photography mode during the video calls, and instructing storage or deletion of the close-up image, according to the user's control.

The input unit 120 generates an input signal for instructing deactivation of the automatically activated sensor unit 180 during the close-up photography mode. When the close-up photography mode is manually operated, the sensor unit 180 remains in a deactivated state, and in this case, the input signal for deactivating the sensor unit 180 may not be generated. The generated input signals are transferred to the controller 160 to be converted into instructions for corresponding functions.

The audio processing unit 130 includes a SPeaKer (SPK) in order to output various audio data sets during an operation of the terminal 100, audio data in response to playback of an audio file storied in the storage unit 150, and audio data received from the external device. The audio processing unit 130 supports audio data acquiring functions. To this end, the audio processing unit 130 includes a MICrophone (MIC). The audio data output by the audio processing unit 130 corresponds to various guide voices or sound effects related to camera control. For example, the audio processing unit 130 outputs audio data such as a guide voice or a sound effect for selection of the close-up photography mode when the close-up photography mode is selected, informing acquisition of the close-up image during the close-up photography mode, informing the end of the close-up photography mode, and guiding an operation of a scan mode in the close-up photography mode. The outputs of the above-described audio data related to the camera may not be provided according to a manufacturer's intention, or even if provided, may be omitted according to the user's set-up.

Audio data acquired through the MIC of the audio processing unit 130 corresponds to an audio signal acquired in a continuous image photography environment such as a scan mode in the close-up photography mode. When the terminal 100 supports the communication functions, the MIC acquires voice signals for the support of the communication functions.

The transparent display unit 140 provides various screens necessary for operating the terminal 100. For example, the transparent display unit 140 supports a standby screen, and a menu screen necessary for operating the terminal 100. The transparent display unit 140 of the present invention is designed such that at least one portion of the transparent display unit 140 is formed of a material with a transmittance. Accordingly, light is transmitted from a front surface to a rear surface of the transparent display unit 140, or from the rear surface to the front surface. When a specific object is disposed on a front side or on a rear side of the transparent display unit 140, light input through the rear surface or the front surface is reflected from the corresponding object, and the light is scattered in the transparent display unit 140, or may penetrate the transparent display unit 140.

When the subject 200 is disposed on a side, for example, the rear side of the transparent display unit 140, light input to the front surface of the transparent display unit 140 penetrates the transparent display unit 140 to reach the subject 200. Accordingly, the user recognizes the subject 200, disposed on the rear side of the transparent display unit 140, through the front surface. Such a recognizing operation as described above is identically performed in the camera module 170. That is, at least one camera module 170, which is disposed above at least one side of the front surface of the transparent display unit 140, for example, above one side of an edge portion of the front surface, is installed and oriented toward the rear surface, and uses light which penetrates the front surface and is reflected from the rear surface of the transparent display unit 140, or light which is scattered on the front surface of the transparent display unit 140, as a light source for the acquisition of the close-up image.

In the transparent display unit 140, configurations of the display area, using components such as electrodes, thin film transistors, pixel electrodes, and light emitting diodes, are formed of a transparent material. Even if the configurations constituting the transparent display unit 140 are transparent, the configurations serve as an obstacle to the incident light, making it difficult to achieve complete transparency. That is, the transparent display unit 140 has a set transmittance. The transparency of the transparent display unit 140 corresponds to a reference value for image calibration that will be applied to the close-up image of the subject 200. That is, a photographed image of the subject 200 has a distorted image value due to the transmittance of the transparent display unit 140 under the condition of being photographed by using a general light source or a standard light source. For example, the photographed image of the subject 200 is dark relative to an image photographed by using the standard light source, and the controller 160 supports the calibration of brightness or darkness for the photographed image according to the transmittance value of the transparent display unit 140. The image calibration according to the transmittance value is experimentally defined data.

The transparent display unit 140 provides various screens related to the operation of the terminal 100 of the present invention. For example, the transparent display unit 140 provides various screens such as a camera control related screen, a camera operation screen, and a camera set-up screen. In particular, the transparent display unit 140 of the present invention provides a menu screen for selection of the close-up photography mode, and remains transparent such that the camera module 170 supports photographing the subject 200 during the operation of the close-up photography mode. That is, the transparent display unit 140 blocks all information output during the operation of the close-up photography mode. For example, the transparent display unit 140 blocks the display of an indicator area that displays a battery status, reception signal intensity as well as a background screen, or a menu screen.

Alternatively, the transparent display unit 140 displays a specific image that the user designates. The displayed specific image overlaps with the subject 200 to be photographed by the camera module 170. To this end, the terminal 100 includes various images that will be output on the transparent display unit 140 during the close-up photography mode. The specific image overlapping with the subject 200 is disposed only on at least one portion of the display area of the transparent display unit 140, and the remaining portion of the display area is formed such that another image is not disposed, which makes it possible to maintain the transmittance of the transparent display unit 140.

For example, the specific image corresponds to a bezel image disposed at an edge area of the transparent display unit 140. The specific image may also be realized in a form of having a set luminosity, and decreasing the transmittance of at least one area in the display area of the transparent display unit 140. Accordingly, when the subject 200 is photographed together with the specific image, an image is acquired in which the at least one area of the subject 200 is dark and opaque relative to the remaining area, or an image in which the impression of color of the subject 200 is different from the actual impression of color.

The storage unit 150 stores various basic operating systems necessary for operating the terminal 100, and data or algorithms such as application programs that correspond to various user functions. In particular, the storage unit 150 stores a camera support program 151 supporting camera control functions of the present invention, and image calibration information 153. The storage unit 150 stores the close-up image acquired through the camera module 170.

The camera support program 151 stores various routines necessary for operating the camera module 170 of the terminal 100. For example, the camera support program 151 includes a routine supporting the close-up photography mode, a general photography mode, and the video calls. The routine supporting the close-up photography mode supports a routine for an automatic photography during the close-up photography, a manual photography, performing the image calibration of the close-up image, and storing or erasing the close-up image.

The camera support program 151 also includes a routine supporting an output of a preview image, and a routine for interrupting the output of the preview image, during the close-up photography mode. The routine for the automatic photography during the close-up photography, which is included in the camera support program 151, includes a routine supporting acquisition of a close-up image of the subject 200 corresponding to a size of the transparent display unit 140, and a routine supporting acquisition of continuous close-up images of the subject 200 having a larger size than that of the transparent display unit 140. The routine for the manual photography includes a routine for outputting a virtual shutter key for instructing the close-up photography in the close-up photography mode at a side of the transparent display unit 140, or allotting the specific key of the input unit 120, which is physically separated from the transparent display unit 140 to be separately disposed, to a shutter key.

The image calibration information 153 corresponds to various algorithms, criterion values, and reference values for calibration of the acquired close-up image. In more detail, the camera module 170 is disposed above the at least one side, for example, the edge portion of the front surface of the transparent display unit 140 to acquire the image of the subject 200 disposed on the rear side of the transparent display unit 140.

When the camera module 170 is disposed above one side of the edge portion of the front surface of the transparent display unit 140, it is difficult to acquire an image for the entire transparent display unit 140. In order to support this, the camera module 170 is formed of a wide view angle lens. However, when the wide view angle camera module 170 is to acquire the image for the entire transparent display unit 140, a blind spot may occur. Accordingly, the camera module 170 of the present invention supporting the close-up photography preferably includes cameras disposed above at least two locations of the edge portion of the front surface of the transparent display unit 140. In this case, images acquired through two or more cameras consequently correspond to photographed images for one subject 200, so the images need to be composed to create one close-up image. The image calibration information 153 corresponds to information having a calibration value and a reference value for composing a plurality of images for one subject 200.

For example, when the wide view angle lens is applied to the camera module 170, the photographed close-up image of the subject 200 disposed on the rear side of the transparent display unit 140 corresponds to a distorted image with a rhombus shape or a shape having a curvilinear boundary instead of a rectangular shape. For calibration of the distorted image, the image calibration information 153 includes a calibration table with values calculated on the basis of criterion points in an image that is acquired through photographing a matrix printed matter, provided with the criterion points, using the wide view angle lens. That is, the image calibration information 153 includes a calibration table with values that are calculated while lattice point values of the matrix printed matter, stored as a vector value, serve as an intermediate value for a pixel. The image calibration information 153, including the calibration table, is acquired and stored by designers in the manufacturing process for the terminal 100. Alternately, the user is guided to set the image calibration information 153 when the user initially uses the camera module 170 of the terminal 100. For example, the above-described matrix printed matter is included with the terminal 100 in the package sold to the user. The user is guided to dispose the matrix printed matter on a side of the transparent display unit 140, and photograph the matrix printed matter, which enables the image calibration information 153 to be stored in the storage unit 150. In general, during the operation of the camera module 170, an error may occur in the image calibration due to the influence of various programs, and the calibration table has to be re-acquired. In this case, the user includes the calibration table in the image calibration table 153 by using the above-described matrix printed matter at a desired time.

The image calibration information 153 has the reference value or the criterion value that will be output in an image for storing a specific close-up image of a plurality of close-up images, or an image that will be provided to the transparent display unit 140. As described above, during the close-up photography mode in the present invention, the particular virtual shutter key is not output to the transparent display unit 140, and an automatic mode supporting automatic and continuous photography of the subject 200 under a condition is supported. When any one of the plurality of close-up images that have been continuously photographed must be selected, a selection is made of the image that has luminosity or saturation of relatively good value or of a criterion value or higher, or the image that is photographed with high intensity of illumination relative to other close-up images. To this end, the image calibration information 153 provides the criterion value or the reference value for the intensity of illumination or luminosity to be used such that a better image of the continuously photographed images is selected during the close-up photography mode.

The image calibration information 153 is used to increase or decrease a degree of the continuous photography such that a close-up image having an intensity of illumination value or higher, or a luminosity value or higher is acquired. For example, when an image having the intensity of illumination value or higher is photographed, the controller 160 of the terminal 100 interrupts the continuous photography, and when an image having the intensity of illumination value or lower is photographed, the controller 160 of the terminal 100 operates the continuous photography for a period of time.

The camera module 170 corresponds to a module configured to acquire a still or moving image. The camera module 170 includes a configuration supporting the camera functions, such as for image acquisition including a lens (not shown), an aperture (not shown), an aperture driver (not shown), and a lens-adjusting unit (not shown). In particular, as described above, the camera module 170 includes the wide view angle lens, and includes the cameras disposed above the at least one side of the front surface of the transparent display unit 140, for example, above the at least two areas of the edge areas of the front surface.

The plurality of cameras is synthesized to simultaneously photograph one subject 200 up close. As described above, the camera module 170 may further include the camera for video calls, and the camera for the general image photography. The camera module 170 for the close-up photography is basically disposed to be oriented in a direction from the front surface edge to the rear surface of the transparent display unit 140. Accordingly, the camera module 170 may photograph the subject 200 disposed on the rear side of the transparent display unit 140.

The sensor unit 180 acquires various sensor signals for a movement or a state of the terminal 100. To achieve this, the sensor unit 180 includes at least one sensor for acquisition of the sensor signals for the state of the terminal 100. For example, the sensor unit 180 includes at least one of various motion sensors such as an acceleration sensor, a geomagnetic sensor, a gyro sensor, and a grip sensor. The sensor signals that the sensor unit 180 acquires are transferred to the controller 160 for control of the camera module 170.

The controller 160 supports control of the terminal 100 for acquisition of the close-up image. That is, the controller 160 supports activation of the camera module 170 for operating the close-up mode according to a user's request or schedule information, and controls the terminal 100 such that the close-up image is automatically acquired according to set-up. In the process, the controller 160 restrains the transparent display unit 140 from outputting data such that the whole display area is transparently processed, and supports the close-up photography in response to the sensor signal transferred from the sensor unit 180. The controller 160 controls such that a calibration is performed on the acquired close-up image, and then the close-up image is output to the transparent display unit 140, or is stored in the storage unit 150 without a separate output process.

Figure 3:
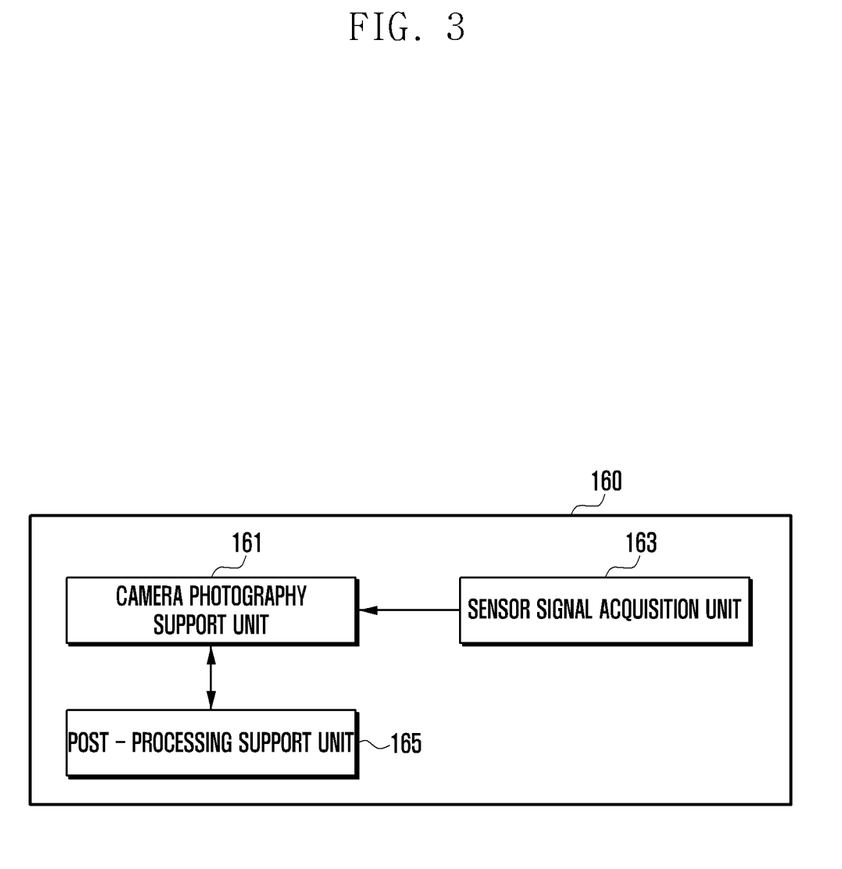
FIG. 3 illustrates a configuration of a controller shown in FIG. 2.

FIG. 3 illustrates a configuration of a controller 160 according to an embodiment of the present invention.

Referring to FIG. 3, the controller 160 includes a camera photography support unit 161, a sensor signal acquisition unit 163, and a post-processing support unit 165.

The sensor signal acquisition unit 163 supports sensor signal acquisition of the sensor unit 180. To this end, the sensor signal acquisition unit 163 controls to activate the sensor unit 180 at a time of activation of the close-up photography mode. The sensor signal acquisition unit 163 acquires a sensor signal such as a sensor signal in response to a vertical movement of the terminal 100, and a sensor signal in response to a horizontal movement of the terminal 100, according to a state change of the terminal, and transfers the acquired sensor signal to the camera photography support unit 161.

The camera photography support unit 161 supports various signal processing related to an operation of the camera module 170 of the present invention. In particular, in order to support the close-up photography, the camera photography support unit 161 assists with outputting an item for selection of the close-up photography mode to the transparent display unit 140, or assists with allocation of the item for selection of the close-up photography mode to a specific key of the input unit 120.

When an input event for the close-up photography occurs, the camera photography support unit 161 supports activation of the camera module 170 disposed for the close-up photography. The camera module 170 may employ the wide view angle lens, and the focal length corresponds to a length between a center of the wide view angle lens and a point on the rear surface of the transparent display unit 140.

When an automatic mode is set, the camera photography support unit 161 controls such that the activated camera module 170 performs the close-up photography at a time interval, and the close-up image is stored. When a manual mode is set, the camera photography support unit 161 supports acquisition and storage of the close-up image in response to a shutter input event. In the process, the camera photography support unit 161 identifies the sensor signal which the sensor signal acquisition unit 163 provides, and when an event for photography completion occurs, or the sensor signal corresponding to the vertical movement of the terminal 100 is acquired, the camera photography support unit 161 supports completion of the close-up photography.

When receiving the sensor signal corresponding to the horizontal movement of the terminal 100, the camera photography support unit 161 supports an operation of a scan mode in the close-up photography mode. In the scan mode, continuous photography of the subject 200 is supported, and the photographed images of the subject 200 are transferred to the post-processing support unit 165. The camera photography support unit 161 transfers information, indicating that the images to transfer correspond to images acquired in the scan mode, to the post-processing support unit 165.

The post-processing support unit 165 performs image calibration for the close-up image that the camera photography support unit 161 has acquired. To achieve this, the post-processing support unit 165 performs the image calibration of the close-up image that the camera photography support unit 161 has transferred by using the image calibration information 153 stored in the storage unit 150. That is, the post-processing support unit 165 composes images acquired by the plurality of cameras included in the camera module 170 to generate one close-up image of the subject 200.

The post-processing support unit 165 supports calibration processing for intensity of illumination, luminosity, and saturation of the close-up image, according to transmittance of the transparent display unit 140. The post-processing support unit 165 supports selection of an image, which has specific intensity of illumination or luminosity, or good intensity of illumination or luminosity relative to other images, of the continuously photographed images. The post-processing support unit 165 supports selection of an image, of the continuously photographed images, that has the highest resolution. The post-processing support unit 165 performs resolution compensation for the selected image, thereby calibrating the photograph to have a higher resolution. For example, the post-processing support unit 165 filters the close-up image to detect boundary points, and performs the image calibration to intensify the detected boundary points, thereby calibrating the photograph to increase the resolution of the photograph. Prior to composing the images photographed by the plurality of cameras, the post-processing support unit 165 adjusts an angle and a perspective for the images photographed through the wide view angle lens. To this end, the post-processing support unit 165 uses the calibration table included in the image calibration information 153.

When receiving the plurality of scan mode based close-up images from the camera photography support unit 161, the post-processing support unit 165 identifies overlapping portions between the received images to compose the continuously photographed images based on the overlapping portions, thereby supporting generation of one close-up image. Accordingly, the post-processing support unit 165 generates the close-up image having a larger size than that of the transparent display unit 140. In the process, the post-processing support unit 165 supports compensation for the intensity of illumination or the luminosity of the close-up image according to the transmittance of the transparent display unit 140.

Figure 4:
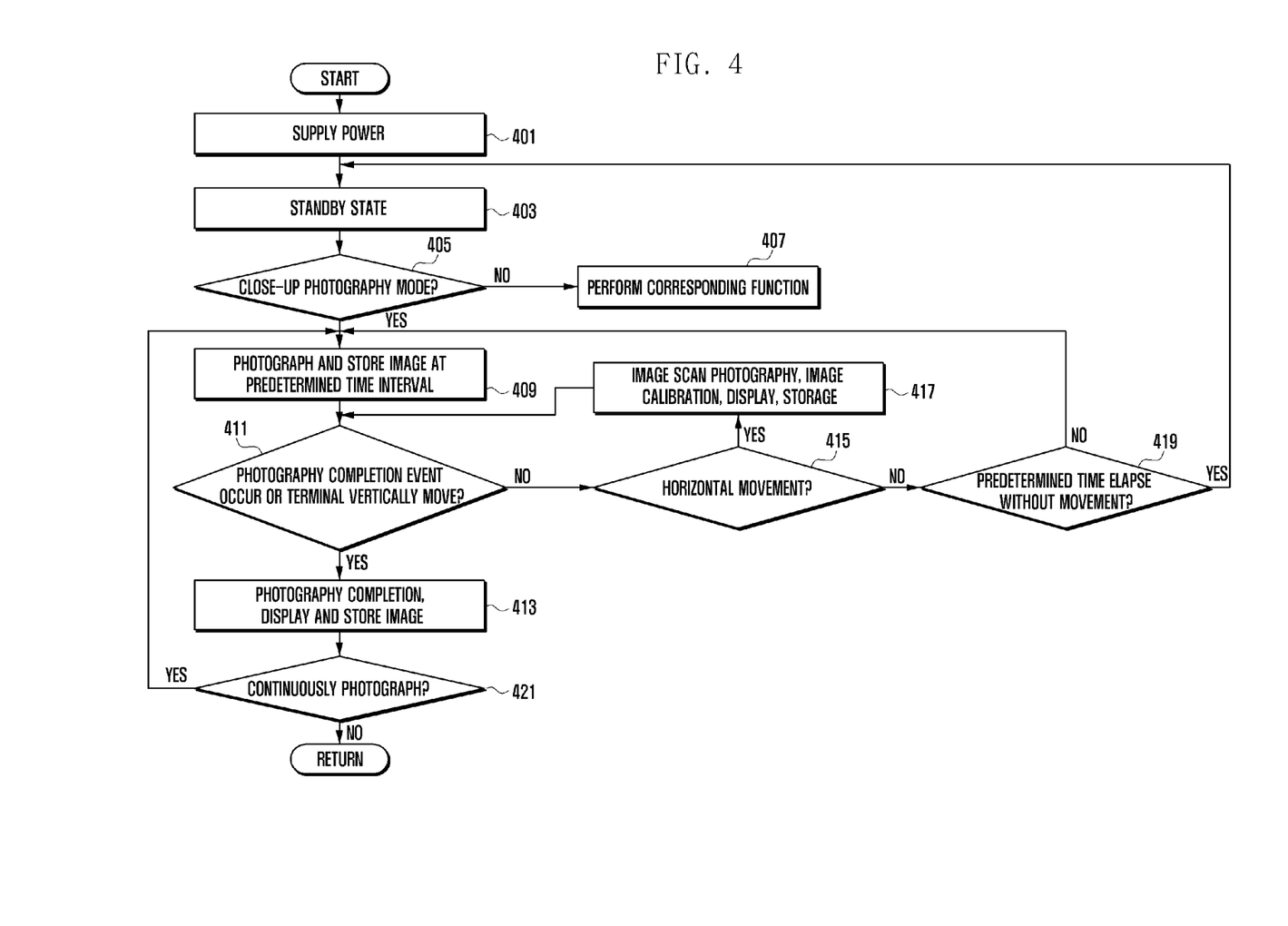
FIG. 4 illustrates a close-up photography method according to an embodiment of the present invention.

FIG. 4 illustrates a close-up photography method according to an embodiment of the present invention.

Referring to FIG. 4, in the close-up photography method of the present invention, in step 401, the controller 160 of the terminal 100 distributes electric power to each configuration of the terminal 100, by using the electric power supplied from a power supply. While the electric power is being supplied, the controller 160 controls the terminal 100 to be maintained in a standby state according to schedule information or a user's input, in step 403. For example, the controller 160 supports output of a background screen to the transparent display unit 140 and a menu screen to the transparent display unit 140, and maintains the input standby state for a period of time.

In step 405, when an input event occurs, the controller 160 determines whether the occurring input event corresponds to an input event for a close-up photography mode. When the controller 160 determines that the occurring input event does not correspond to the input event for the close-up photography mode, the controller 160 supports terminal functions in response to the input event, in step 407. For example, the controller 160 supports performing of functions such as file playback, file search, web access, phone call, and a game according to a type of the occurring input event.

When the controller 160 determines that the occurring input event corresponds to the input event for the close-up photography mode in step 405, the controller 160 activates the camera module 170 allotted for the close-up photography, and controls such that an image is photographed and stored at a time interval in step 409. An image photography and storage step corresponds to temporarily storing the acquired image. The controller 160 supports performing of an automatic focusing function of the camera module 170, together with the activation of the camera module 170. For example, the controller 160 controls such that a focus of the camera module 170 corresponds to a point on the rear surface of the transparent display unit 140.

In step 411, the controller 160 determines whether a photography completion event occurs, or whether a specific sensor signal, for example, a sensor signal according to a vertical movement of the terminal is activated. To this end, the controller 160 controls such that the sensor unit 180 is activated to acquire the sensor signal, together with the activation of the camera module 170. In step 411, when the controller 160 determines that an input event for the close-up photography completion occurs, or that the sensor signal according to the vertical movement of the terminal is activated, the controller 160 controls such that the close-up photography is completed, and the temporarily stored image is calibrated, displayed on the transparent display unit 140, and stored in the storage unit 150, in step 413.

The controller 160 controls such that the calibrated image is stored according to a user's request, or as a default. In the image calibrating process, the controller 160 performs compensation for intensity of illumination or luminosity according to the transmittance, and compensation for a degree of indefiniteness according to a shake. The controller 160 supports at least one of selecting an image having relatively good intensity of illumination, luminosity, and a resolution among a plurality of images photographed at a period of time, compensating for a perspective or a focus of the images acquired through the plurality of cameras, and generating one close-up image through a composing operation for the compensation completed images.

In step 411, when the controller 160 determines that the corresponding completion event or the sensor signal according to the vertical movement of the terminal does not occur, the controller 160 determines whether a sensor signal according to a horizontal movement of the terminal 100 is activated, in step 415. When the controller 160 determines that the sensor signal according to the horizontal movement of the terminal 100 is activated, the controller 160 supports image scan photography, and supports calibration, display, and storage of the image, in step 417. For example, for the scan photography, the controller 160 supports generation of one close-up image through composition of the images on the basis of overlapping portions between the images that have been continuously photographed at a period of time.

The scan photography is completed when the horizontal movement is interrupted for a period of time, the terminal 100 is vertically moved, a period of time for the scan photography elapses, or a horizontal movement for the scan photography is performed. In this case, the controller 160 completes the scan photography, and supports calibration, display, and storage of the scan-photographed images.

The controller 160 performs image calibration, that is, improvement of intensity of illumination, luminosity, and a resolution according to transmittance for the photographed images. The controller 160 periodically samples relatively good images among a plurality of images that have been photographed at a time interval, and then performs image composition based on the overlapping portions between the photographed images. The controller 160 performs distortion compensation for the intensity of illumination by the time, according to the perspective or the transmittance for the images that the plurality of cameras has photographed, and composes the images to acquire a single first close-up image.

The controller 160 interlinks the close-up images, acquired by the time, based on the overlapping portions to support generation of a second close-up image larger than the first close-up image. In a process of generating the second close-up image, the controller 160 controls such that relatively good images among the plurality of first close-up images are selected, and the second close-up image is generated from the selected first close-up images.

In a process of selecting the first close-up images, a method in which the first close-up images are grouped in frames is applied, for example, in ten sheets when one hundred sheets of close-up images are acquired, and relatively good first close-up images are selected in each group. In the present invention, although the first close-up images are grouped in sheets, for example, in twenty sheets, and two or more first close-up images are selected in each group, an error does not occur when the first close-up images, having image overlapping portions within a range, are selected and interlinked. After supporting the image scan photography in step 417, the controller 160 re-determines whether the event for the photography completion occurs, in step 411. After the completion of the scan photography, the controller 160 performs signal flow control according to a routine for performing anew the above processes, in step 421.

When the horizontal movement does not occur in step 415, the controller 160 determines whether a time elapses without a movement of the terminal 100 in step 419, and if the time elapses, the controller 160 automatically completes an operation in the close-up photography, and returns to step 403. When the photography is completed, the controller 160 performs a control to deactivate the camera module 170, interrupt power supply to the camera module 170, stop an operation of the sensor unit 180, and interrupt power supply to the sensor unit 180. When the time does not elapse in step 415, the controller 160 returns to step 409 to perform anew the above processes, and thus supports the close-up image acquisition for the specific subject 200, or the close-up image acquisition according to application of the scan mode.

After step 413, and according to a design form, after step 417, the controller 160 determines whether the close-up photography will be continued, in step 421. When an input event or a sensor signal for continuous photography occurs, the controller 160 returns to step 409 to perform the above processes. When the input event for the continuous photography does not occur, or an event for completing the close-up photography mode occurs, the controller 160 returns to step 403 to perform the above processes. The controller 160 controls deactivation of the camera module 170 and the sensor unit 180, which have been used for the close-up photography.

As described above, in the close-up photography method according to the embodiment of the present invention, the close-up image is acquired by means of the camera module 170 disposed based on the transparent display unit 140, which enables the close-up image of the subject 200 to be readily acquired only through the activation of the close-up photography mode, and the operation where the transparent display unit 140 accesses the subject 200, without a separate focus adjusting operation.

Figure 5:
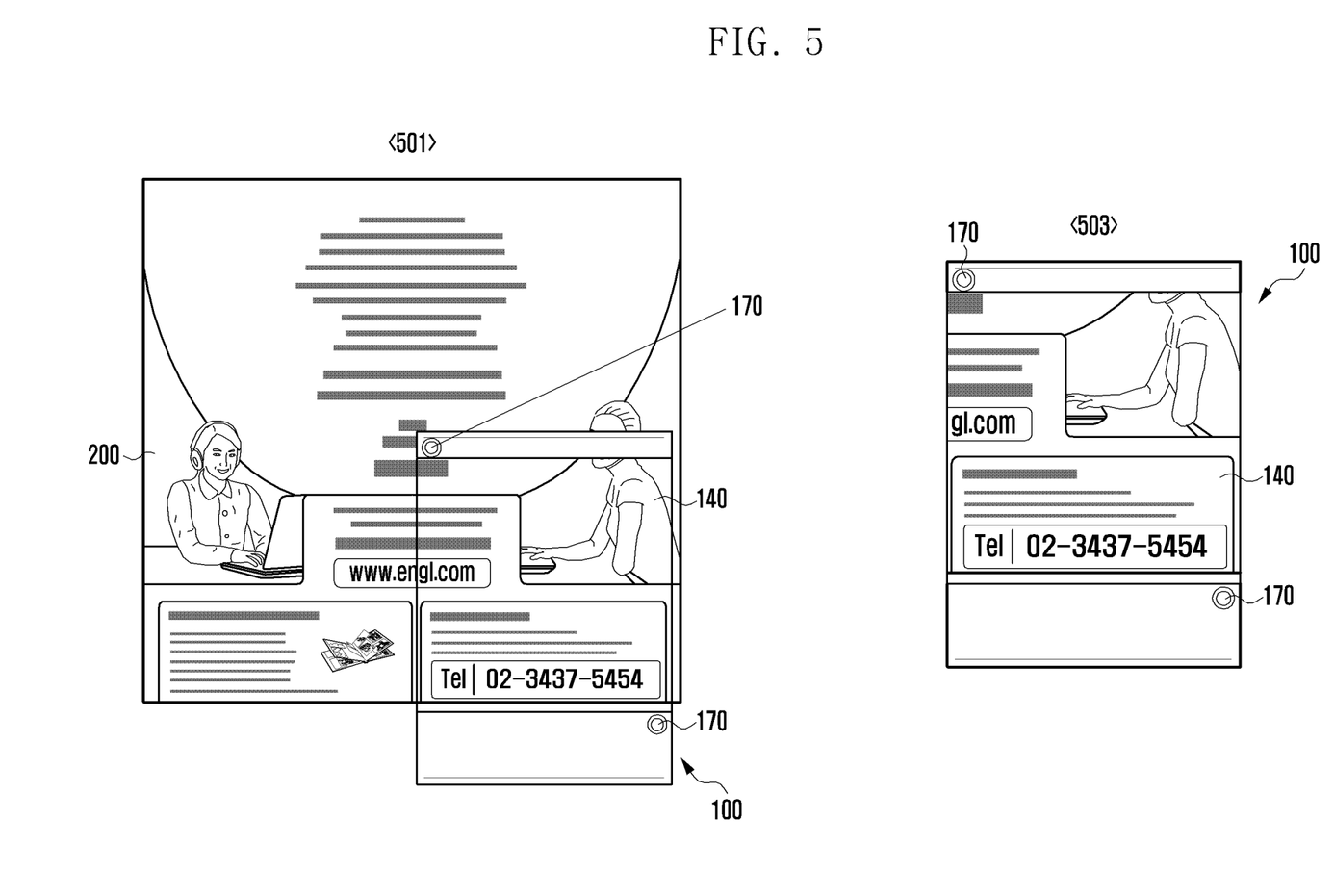
FIG. 5 illustrates a screen for illustrating close-up photography functions according to an embodiment of the present invention.
Figure 6:
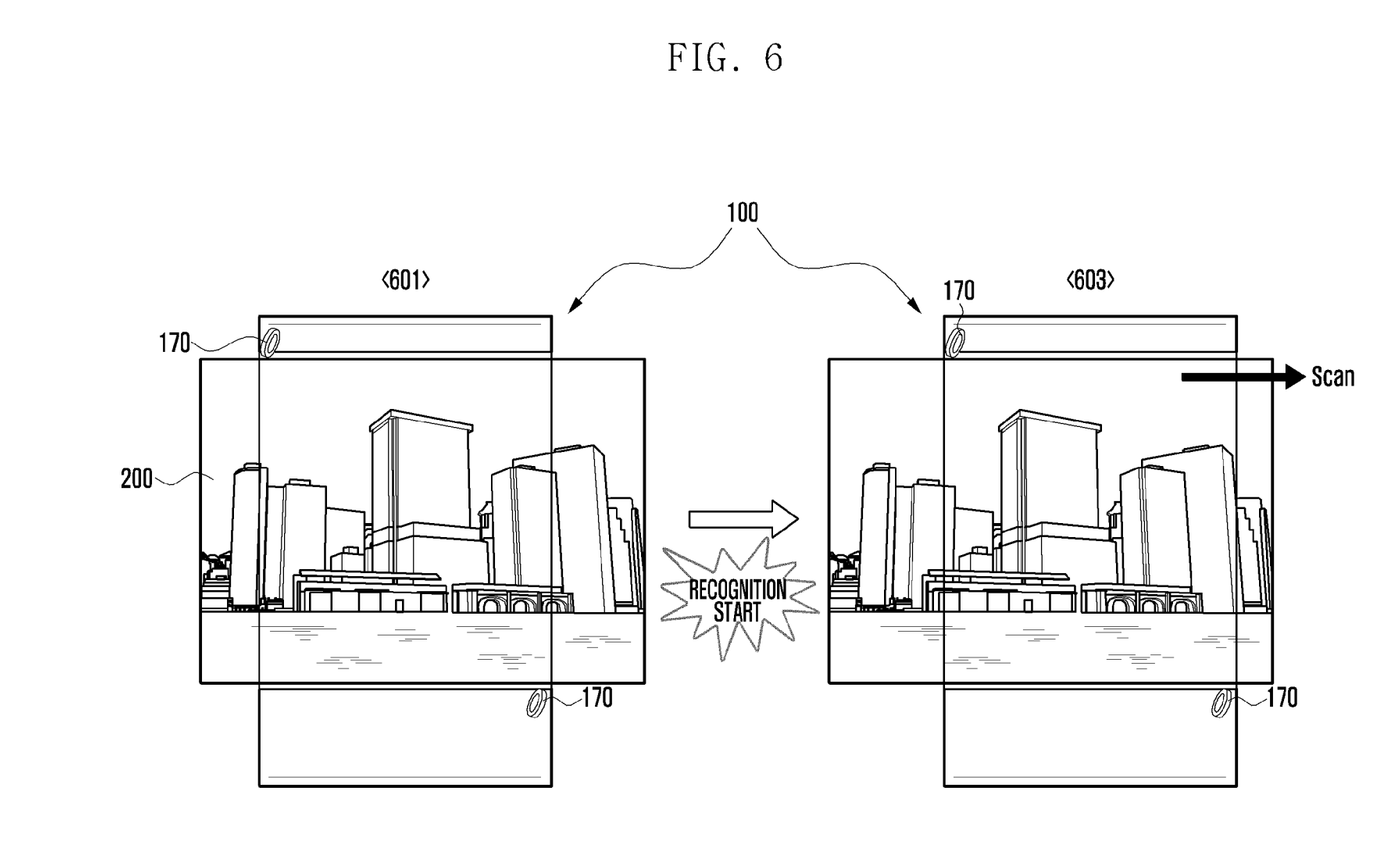
FIG. 6 illustrates a screen for illustrating close-up photography functions according to another embodiment of the present invention.

FIGS. 5 and 6 illustrate a device operation for illustrating close-up photography functions according to an embodiment of the present invention.

Referring to FIG. 5, when a subject 200 is provided as shown in 501, a user, desiring to perform close-up photography for an area of the subject 200, controls the terminal 100 such that a close-up photography mode is activated. When an automatic mode has been set, the camera module 170 continuously acquires images at a period of time according to the activation of the close-up photography mode. The camera module 170 may continuously photograph images for a portion of the subject 200 for a period of time. The camera unit 170 may also perform the close-up photography in response to a sensor signal transferred from a sensor unit 180 under the control of a controller 160.

Specifically, after the activation of the close-up photography mode, when the terminal 100 moves a certain length, and then is stopped for a period of time, the camera module 170 performs image photography, and when a sensor signal according to a vertical movement of the terminal 100 occurs, the image photography is stopped. Alternately, when a manual mode has been set, after the activation of the close-up photography mode, the terminal 100 acquires close-up images when a shutter input for instructing the close-up photography occurs, a voice input corresponding to the shutter input, or a motion or capture operation corresponding to the shutter input occurs.

When the close-up photography is completed, the terminal 100 performs image calibration for the photographed images. That is, the terminal 100 performs compensation for intensity of illumination, luminosity, saturation, and impression of color for the images acquired through the camera module 170 including a plurality of cameras, according to a transmittance application of the transparent display unit 140. The terminal 100 compensates for distortion of an angle or a perspective of the photographed images, composes the corresponding images, and outputs the composite image on the transparent display unit 140 as shown in FIG. 503. The terminal 100 outputs a virtual key, for determining whether the corresponding close-up image is stored or erased, on a side of the transparent display unit 140. The terminal 100 stores the close-up image displayed on the transparent display unit 140 in a storage unit 150, or erases the close-up image displayed on the transparent display unit 140, in response to occurrence of an input event according to storage or erasure.

In an operation state of the terminal 100 corresponding to a capture operation, for example, without a vertical movement, when a state of operation abeyance remains for a period of time, the terminal 100 stops the close-up photography, and then is converted into a standby state or returns to a terminal function performed before the close-up photography.

Referring to FIG. 6, as shown in 601 and 603, the user arranges a transparent display unit 140 of a terminal 100 above a location of a subject 200. After activating the close-up photography mode, the user locates the transparent display unit 140 above the subject 200, or after arranging the transparent display unit 140 above the location of the subject 200, the user activates the close-up photography mode. The user moves the terminal 100 above the corresponding subject 200.

The terminal 100 activates a sensor unit 180 while activating a camera module 170 according to a request for activating the close-up photography mode. When a sensor signal according to a horizontal movement is received, the terminal 100 recognizes this as a scan mode to perform an image processing according to the scan mode. The terminal 100 performs calibration for images photographed at a time interval, or at a horizontal movement length interval to generate a plurality of first close-up images. The terminal 100 generates a second close-up image larger than the transparent display unit 140 by using the plurality of first close-up images, and outputs the second close-up image on the transparent display unit 140, or stores the second close-up image under the user's control.

In the process, the terminal 100 outputs only a portion of the second close-up image on the transparent display unit 140, or resizes the second close-up image for a size of the transparent display unit 140 to display the resized second close-up image. The completion of the scan mode is performed as a specific motion operation, for example, a vertical movement of the terminal 100 occurs, or an input event for completion occurs. The subject 200 corresponds to an object disposed on a wall or the bottom.

Although the scan mode according to the horizontal movement of the terminal 100 has been described above, the present invention is not limited thereto. That is, in the scan mode of the terminal 100, an image could be photographed according to a trace along which the terminal 100 moves in various manners such as a vertical, a horizontal, a diagonal, and a curvilinear manner on the subject 200, and a close-up image could be provided. At this time, the terminal 100 acquires information on the movement trace of the terminal 100, and generates the second close-up image from the first close-up images based on the acquired information on the movement trace. For example, while operating the terminal 100 in the scan mode, when the user moves the terminal 100 along a curvilinear trace, the second close-up image is generated through composition of the first close-up images disposed in a curvilinear shape. In this manner, the second close-up image according to the movement trace of the terminal 100 is output on the transparent display unit 140, and in the output process, the second close-up image is resized for the size of the transparent display unit 140 to be output. When the second close-up image is displayed larger than a display area of the transparent display unit 140, the user identifies other areas, which are not displayed on the transparent display unit 140, by using a navigation key, or by instructing a screen movement.

In a process of supporting the scan mode, the terminal 100 is vertically moved with respect to an axis of the Earth. For example, when a subject on a wall is scanned by using the terminal 100, the terminal 100 is moved not only leftward and rightward but also upward and downward with respect to the Earth's axis, which is recognized as a vertical motion of the terminal 100. Accordingly, the terminal 100 of the present invention provides the scan mode as a separate close-up photography item, and when the scan mode is selected, the terminal 100 also assists close-up photography completion control according to the vertical movement of the terminal 100.

For example, the terminal 100 includes a grip sensor disposed on a side surface of the transparent display unit 140. When the user moves the terminal 100, while grasping the side surface of the transparent display unit 140, the terminal 100 recognizes this as a scan mode to support the close-up photography in the scan mode, and when released, the terminal 100 also supports completion of the close-up photography. As a result, it will be appreciated that the close-up photography method of the present invention is not limited to specific mode activation through specific operations or input events, and supports functions configured to acquire a single close-up image at a time of close-up photography, and functions configured to acquire a scan image from a plurality of close-up images, while supporting securing of a light source through the transparent display unit 140.

As described above, even if the user locates the terminal 100 above the specific subject 200, or locates the specific subject 200 above the transparent display unit 140, the terminal 100 supporting the close-up photography of the present invention performs securing of a photography light source, thereby supporting easy performance of the close-up photography. In addition, the terminal 100 supports the close-up photography even if the terminal does not contact the specific subject 200 during the close-up photography mode. The terminal 100 does not select only one of the continuously photographed images but all the photographed images, or the images sampled at a time interval among the entire images, to support an output of the selected images to the transparent display unit 140.

The present invention may photograph an image identical with that shown through the transparent display unit without separate criterion points to support an effect of capturing or scanning the image.

The above-described terminal 100 may further include additional modules. That is, the terminal 100 may further include unmentioned configurations such as a near field communication module for wireless communication in a near range, an interface for data transmission/reception of the terminal 100 in a wired or wireless communication manner, an Internet communication module for performing internet functions through communication with an Internet network, and a digital broadcasting module for performing a digital broadcasting reception function and a playback function. Since the configurations are variously modified according to a convergence tendency of digital devices, not all of the configurations are illustrated, but other configurations identical with the above-mentioned configurations could be further included in the device.

The terminal 100 according to embodiments of the present invention includes all information communication devices, multimedia devices, and their applications, such as Portable Multimedia Players (PMPs), digital broadcasting players, Personal Digital Assistants (PDAs), audio players (e.g., MP3 players), mobile game terminals, smart phones, notebook computers, and handheld PCs, in addition to all of mobile communication terminals operated according to communication protocols corresponding to various communication systems.

Although embodiments of the present invention have been shown and described in this specification and the drawings, they are generally used to easily explain technical contents of the present invention, and to assist comprehension of the present invention, and are not intended to limit the scope of the present invention. It is obvious to those skilled in the art to which the present invention pertains that other modified embodiments on the basis of the spirit of the present invention besides the embodiments disclosed herein can be made.

What is claimed is:

1. A terminal, comprising:
a transparent display unit having front and rear surfaces through which light passes to illuminate a subject proximate to the rear surface of the transparent display unit, the transparent display unit having a set thickness;
at least one camera module disposed at the transparent display unit, configured to acquire an image of the subject displayed through a display area of the transparent display unit in a direction configured to penetrate the transparent display unit; and
a controller configured to control the camera module and to control the transparent display unit to display the image of the subject proximate to the rear surface of the transparent display unit on the front surface of the transparent display unit transparently through front and rear surfaces of the terminal.

2. The terminal of claim 1, wherein the camera module comprises:
a plurality of cameras disposed in at least two locations on the transparent display unit.

3. The terminal of claim 2, wherein the controller composes a plurality of images acquired through the cameras to generate a single close-up image for the subject.

4. The terminal of claim 2, wherein the cameras are configured to photograph an image of the subject based on a wide view angle lens.

5. The terminal of claim 4, wherein a matrix print matter where criterion points are disposed in a matrix form is photographed, and the controller compensates for angle and perspective distortions of the image, acquired through the wide view angle lens, based on the criterion points of the photographed matrix print matter.

6. The terminal of claim 1, further comprising:
a sensor unit configured to sense an operation state of the terminal.

7. The terminal of claim 6, wherein, when a sensor signal is transferred from the sensor unit according to a movement of the terminal for a scan mode operation, or according to grasping of the terminal, a plurality of images for the subject is photographed at a time interval or at a length interval such that a plurality of first close-up images are acquired, and
the controller controls to acquire a second close-up image interlinked based on overlapping areas between the first close-up images.

8. The terminal of claim 7, wherein the controller arranges the first close-up images according to a movement trace of the terminal, and controls to acquire the second close-up image according to the movement trace.

9. The terminal of claim 7, wherein the controller controls to resize the second close-up image such that the resized second close-up image are output on the transparent display unit.

10. The terminal of claim 6, wherein the controller calibrates at least one of intensity of illumination, luminosity, saturation, and impression of color of the photographed image according to transmittance of the transparent display unit.

11. A close-up photography method, comprising:
activating a camera module including at least one camera which are disposed at a front side of a transparent display unit of a terminal, and employ a wide view angle lens;
photographing an image using the at least one camera of a subject disposed on a rear side of the transparent display unit, wherein the subject is displayed by light passing through a display area of the transparent display unit and the terminal which is transparently controlled via a controller, and
displaying the image, which the at least one camera photographed, of the subject proximate to the rear surface of the transparent display unit on the front side of the transparent display unit.

12. The method of claim 11, wherein photographing the image of the subject comprises:
continuously photographing the image of the subject at a time interval; and
selecting an image having a relatively good intensity of illumination or resolution, among the continuously photographed images.

13. The method of claim 12, further comprising:
at least one of outputting the selected image on the transparent display unit, and storing the selected image in a storage unit.

14. The method of claim 11, further comprising:
sensing a movement of a terminal, or sensing grasping of a specific portion of the terminal.

15. The method of claim 14, wherein photographing the image of the subject comprises:
continuously photographing, when the terminal moves above the subject, the images of the subject at a time interval or at a movement length interval to generate a plurality of first close-up images; and
interlinking the plurality of first close-up images based on overlapping portions between the plurality of first close-up images to generate a second close-up image.

16. The method of claim 15, further comprising:
at least one of resizing the second close-up image for a display area of the transparent display unit to output the resized second close-up image on the transparent display unit, and storing the second close-up image in a storage unit.

17. The method of claim 15, wherein generating the second close-up image comprises:
sampling images, where at least one of intensity of illumination or resolution is relatively good, among the first close-up images; and
interlinking the overlapping portions of the sampled first close-up images to generate the second close-up image.

18. The method of claim 14, further comprising:
deactivating the camera module, when the movement of the terminal corresponds to a vertical movement or an operation of the terminal is stopped for a period of time.

19. The method of claim 11, further comprising:
photographing a matrix print matter, where criterion points are disposed in a matrix form, by using the wide view angle lens, and storing a calibration table for wide view angle lens photography generated on the basis of the criterion points; and
performing compensation for an angle and a perspective of an image, photographed through the wide view angle lens, based on the calibration table.

20. The method of claim 11, further comprising:
  calibrating at least one of intensity of illumination, luminosity, saturation, and impression of color according to transmittance of the transparent display unit.

* * * * *